(12) United States Patent
Hsu et al.

(10) Patent No.: US 10,864,667 B2
(45) Date of Patent: Dec. 15, 2020

(54) MOLDING SYSTEM FOR PREPARING AN IN-MOLD DECORATED ARTICLE

(71) Applicant: CORETECH SYSTEM CO., LTD., Chupei (TW)

(72) Inventors: Chih-Chung Hsu, Chupei (TW);
Tung-Huan Su, Chupei (TW);
Hsien-Sen Chiu, Chupei (TW);
Chia-Hsiang Hsu, Chupei (TW);
Rong-Yeu Chang, Chupei (TW)

(73) Assignee: CORETECH SYSTEMS CO., LTD., Chupei (TW)

( * ) Notice: Subject to any disclaimer, the term of this patent is extended or adjusted under 35 U.S.C. 154(b) by 254 days.

(21) Appl. No.: 15/913,102

(22) Filed: Mar. 6, 2018

(65) Prior Publication Data
US 2019/0030775 A1 Jan. 31, 2019

Related U.S. Application Data

(63) Continuation-in-part of application No. 15/662,859, filed on Jul. 28, 2017, now abandoned.

(51) Int. Cl.
*B29C 45/76* (2006.01)
*B29C 45/77* (2006.01)
*B29C 45/78* (2006.01)
*B29C 45/14* (2006.01)
*G06F 30/20* (2020.01)
(Continued)

(52) U.S. Cl.
CPC ...... *B29C 45/7693* (2013.01); *B29C 45/7613* (2013.01); *B29C 45/77* (2013.01); *B29C 45/78* (2013.01); *G06F 30/20* (2020.01); *B29C 45/14778* (2013.01); *G06F 2113/22* (2020.01)

(58) Field of Classification Search
CPC .......... B29C 45/14778; B29C 45/7613; B29C 45/7693; B29C 45/77; B29C 45/78; B29C 45/14688; B29C 45/1679; G06F 17/5009; G06F 2217/41
USPC ......................................................... 425/127
See application file for complete search history.

(56) References Cited

U.S. PATENT DOCUMENTS

2014/0200710 A1\* 7/2014 Chang ..................... G06F 30/23
700/197

OTHER PUBLICATIONS

Chen et al_International Communications in Heat and Mass Transfer 37 (2010) 501-505 (Year: 2010).\*
Polycarbonate—Wikipedia_2016 (Year: 2016).\*

\* cited by examiner

*Primary Examiner* — Matthew J Daniels
*Assistant Examiner* — Yunju Kim
(74) *Attorney, Agent, or Firm* — Juan Carlos A. Marquez; Marquez IP Law Office, PLLC

(57) ABSTRACT

A molding system comprises a mold, a molding machine, a computing apparatus, and a controller. The computing apparatus is programmed to perform a first simulation to generate a velocity distribution and a temperature distribution of the molding material in a first portion of a simulating domain and a second simulation to generate a melting distribution of the solid decorating film in a second portion of the simulating domain, wherein the simulating domain corresponds to the mold cavity. The first molding simulation is to performed using a molding condition of the molding machine to set a boundary condition of the first portion, and the second molding simulation is performed using the velocity distribution and the temperature distribution of the molding material to set a boundary condition of the second portion.

11 Claims, 13 Drawing Sheets

(51) Int. Cl.
*G06F 13/22* (2006.01)
*G06F 113/22* (2020.01)

MOLDING SYSTEM FOR PREPARING AN IN-MOLD DECORATED ARTICLE

PRIORITY CLAIM AND CROSS-REFERENCE

This application is a continuation-in-part application of U.S. patent application Ser. No. 15/662,859, filed Jul. 28, 2017, which is incorporated herein by reference in its entirety.

TECHNICAL FIELD

The present disclosure relates to a molding system for preparing an in-mold decorated article using a computer-aided engineering (CAE) simulation.

DISCUSSION OF THE BACKGROUND

Injection molding is a technology commonly used for high-volume manufacturing of parts made of meltable material, most commonly of parts made of thermoplastic polymers. Some plastic articles have decorative patterns thereon for aesthetic considerations. An In-Mold-Decoration (IMD) technology is developed to prepare the plastic articles with decorative patterns. In-mold decoration processes involve decorating articles as they are Formed, in mold, of a heated plastic material that is injected into a mold cavity. Usually a tape or strip of a decorative or protective material is positioned in the mold cavity, interfacing therein with the plastic material as it is filled into the mold cavity, under heat and pressure. As the article is formed, the decorative material forms on the surface of the article and becomes an integral and permanent part of the article, through thermal transfer during the in-mold decoration process.

In general, the setting of molding conditions of the injection molding machine performing the IMD process requires a large number of trial molding operations and a long setting time because the setting work greatly depends on the know-how and experience of an operator of the injection molding machine, and various physical values are interdependent as well.

Therefore, a virtual molding, i.e., a computer-implemented simulation, by use of CAE (Computer-Assisted Engineering) is performed for the injection molding, and the optimal molding conditions are then defined based on information gained from the virtual molding. Using virtual molding with CAE, phenomena that occur in a mold cavity can be simulated within a short period of time, and the results of the simulation can be used to determine optimal values of resin temperature, pressure, shear rate, etc. to achieve desired characteristics of molded products. Therefore, if the molding phenomena occurring within a mold cavity can be accurately understood, using CAE may enable optimization of molding conditions and stable molding of non-defective products.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a method for preparing an in-mold decorated article using a molding machine controlled by a controlling module connected to the molding machine. In some embodiments of the present disclosure, the method for preparing an in-mold decorated article comprises steps of: specifying a simulating domain corresponding to a genuine domain in a mold disposed on the molding machine, wherein the genuine domain has a mold cavity to be filled with a solid decorating film and a fluid molding material; performing a first molding simulation executed on the controlling module to generate a velocity distribution of the fluid molding material in a first portion of the simulating domain, wherein the first molding simulation is performed using a molding condition of the molding machine to set a boundary condition of the first portion; performing a second molding simulation executed on the controlling module to generate a velocity distribution of the solid decorating film in a second portion of the simulating domain, wherein the second molding simulation is performed using the velocity distribution of the fluid molding material to set a boundary condition of the second portion; inserting the solid decorating film into the second portion of the genuine domain; and controlling the molding machine by the controlling module using the molding condition to perform an actual molding for injecting the fluid molding material into the first portion of the genuine domain.

Another aspect of the present disclosure provides a non-transitory computer medium containing computer instructions stored therein for causing a computer processor to perform operations for preparing an in-mold decorated article using a molding machine. In some embodiments of the present disclosure, the operations comprise steps of: specifying a simulating domain corresponding to a genuine domain in a mold disposed on the molding machine, wherein the genuine domain has a mold cavity to be filled with a solid decorating film and a fluid molding material; performing a first molding simulation executed on the controlling module to generate a velocity distribution of the fluid molding material in a first portion of the simulating domain, wherein the first molding simulation is performed using a molding condition of the molding machine to set a boundary condition of the first portion; performing a second molding simulation executed on the controlling module to generate a velocity distribution of the solid decorating film in a second portion of the simulating domain, wherein the second molding simulation is performed using the velocity distribution of the fluid molding material to set a boundary condition of the second portion; and controlling the molding machine by the controlling module using the molding condition to perform an actual molding for injecting the fluid molding material into the first portion of the genuine domain, wherein the solid decorating film is inserted into the mold cavity before the actual molding.

Another aspect of the present disclosure provides a molding system for preparing an in-mold decorated article. In some embodiments of the present disclosure, the molding system comprises a mold having a mold cavity, where a solid decorating film is disposed in the mold cavity; a molding machine configured to fill the mold cavity with a fluid molding material; a computing apparatus connected to the molding machine; and a controller connected to the computing apparatus. In some embodiments of the present disclosure, the computing apparatus is programmed to perform operations comprising steps of: specifying a simulating domain corresponding to a genuine domain in the mold disposed on the molding machine; performing a first molding simulation to generate a temperature distribution and a velocity distribution of the fluid molding material in a first portion of the simulating domain, wherein the first molding simulation is performed using a molding condition of the molding machine to set a boundary condition of the first portion; and performing a second molding simulation to generate a melting distribution of the solid decorating film in a second portion of the simulating domain, wherein the second molding simulation is performed using the temperature distribution and the velocity distribution of the fluid molding material to set a boundary condition of the solid decorating film in the second portion. In some embodiments of the present disclosure, the controller is configured to control the molding machine with the molding condition to perform an actual molding for injecting the fluid molding material into the mold cavity, wherein the solid decorating film is inserted into the mold cavity before the actual molding.

In some embodiments of the present disclosure, the computing apparatus is programmed to further perform a step of repeating the first molding simulation using the melting distribution of the solid decorating film to set the boundary condition of the first portion.

In some embodiments of the present disclosure, the computing apparatus is programmed to perform the second molding simulation by setting a zero-velocity boundary condition of the solid decorating film in the second portion along a first direction substantially perpendicular to a flow direction of the fluid molding material.

In some embodiments of the present disclosure, the computing apparatus is programmed to perform the second molding simulation by setting a zero-velocity boundary condition of the solid decorating film in the second portion along a second direction substantially perpendicular to the first direction and to the flow direction of the fluid molding material.

In some embodiments of the present disclosure, the computing apparatus is programmed to further perform a step of calculating a bulk displacement of the solid decorating film using the velocity distribution of the second portion.

In some embodiments of the present disclosure, the computing apparatus is programmed to perform the first molding simulation using an initial velocity of the solid decorating film to set the boundary condition of the first portion.

In some embodiments of the present disclosure, the computing apparatus is programmed to set the initial velocity of the solid decorating film to be zero.

In some embodiments of the present disclosure, the second molding simulation generates a velocity distribution of the solid decorating film along the thickness direction with respect to the filling time of the fluid molding material.

In some embodiments of the present disclosure, the computing apparatus is programmed to further perform a step of repeating the first molding simulation using the velocity distribution of the solid decorating film to set the boundary condition of the first portion.

In some embodiments of the present disclosure, the second molding simulation generates a temperature distribution of the solid decorating film along the thickness direction with respect to the filling time of the fluid molding material.

In some embodiments of the present disclosure, the computing apparatus is programmed to further perform a step of repeating the first molding simulation using the temperature distribution of the solid decorating film to set the boundary condition of the first portion.

In some embodiments of the present disclosure, the melting distribution of the solid decorating film includes a temperature distribution and a velocity distribution of the solid decorating film along a thickness direction with respect to a filling time of the fluid molding material.

In some embodiments of the present disclosure, after completion of the molding simulation of the fluid molding material being injected into the mold cavity, the bulk displacement of the solid decorating film can be evaluated using the velocity distribution of the second portion. In some embodiments of the present disclosure, if the bulk displacement exceeds a predetermined value, then the solid decorating film is deemed to be moving away from the design position, the corresponding molding condition is deemed an inappropriate one, a new molding condition is used to set the molding condition of the molding machine 10 and the computing apparatus performs the molding simulation until the bulk displacement does not exceed the predetermined value.

The exemplary embodiment of the present disclosure using the composite simulation, method (with the simplified governing equations for the solid decorating film) can more accurately and rapidly simulate the molding phenomena of the fluid molding material as it is injected into the mold cavity to prepare the in-mold decorated article than the full simulation method (with the non-simplified governing equations for the solid decorating film).

In addition, by assuming that the movement of the solid decorating film along the directions perpendicular to the flow direction is zero, the embodiments of the present disclosure simplify the numerical solving of the governing equations for the solid decorating film. Compared to the full simulation method, the computing time can be dramatically decreased by using the composite simulation method according to some embodiments of the present disclosure.

Generally, the molding simulation is applied to the fluid molding material, e.g., to simulate the flow phenomena of the fluid molding material, and is not applied to the solid. In contrast, the present disclosure applies the molding simulation to the solid decorating film, e.g., to simulate of the melting phenomena of the solid decorating film.

Before the hot and fluid molding material is injected into the mold cavity, the decorating film in the mold cavity is in the solid state, rather than the fluid state, it is common knowledge that solid molding material, such as the decorating film, does not flow like the fluid molding material. The present disclosure uses the feature of performing a second molding simulation to generate a melting distribution of the solid decorating film due to the heat transfer from the hot molding material. In addition, the present disclosure uses the feature of performing a second molding simulation to generate a velocity distribution of the solid decorating film due to the heat transfer from the hot molding material.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
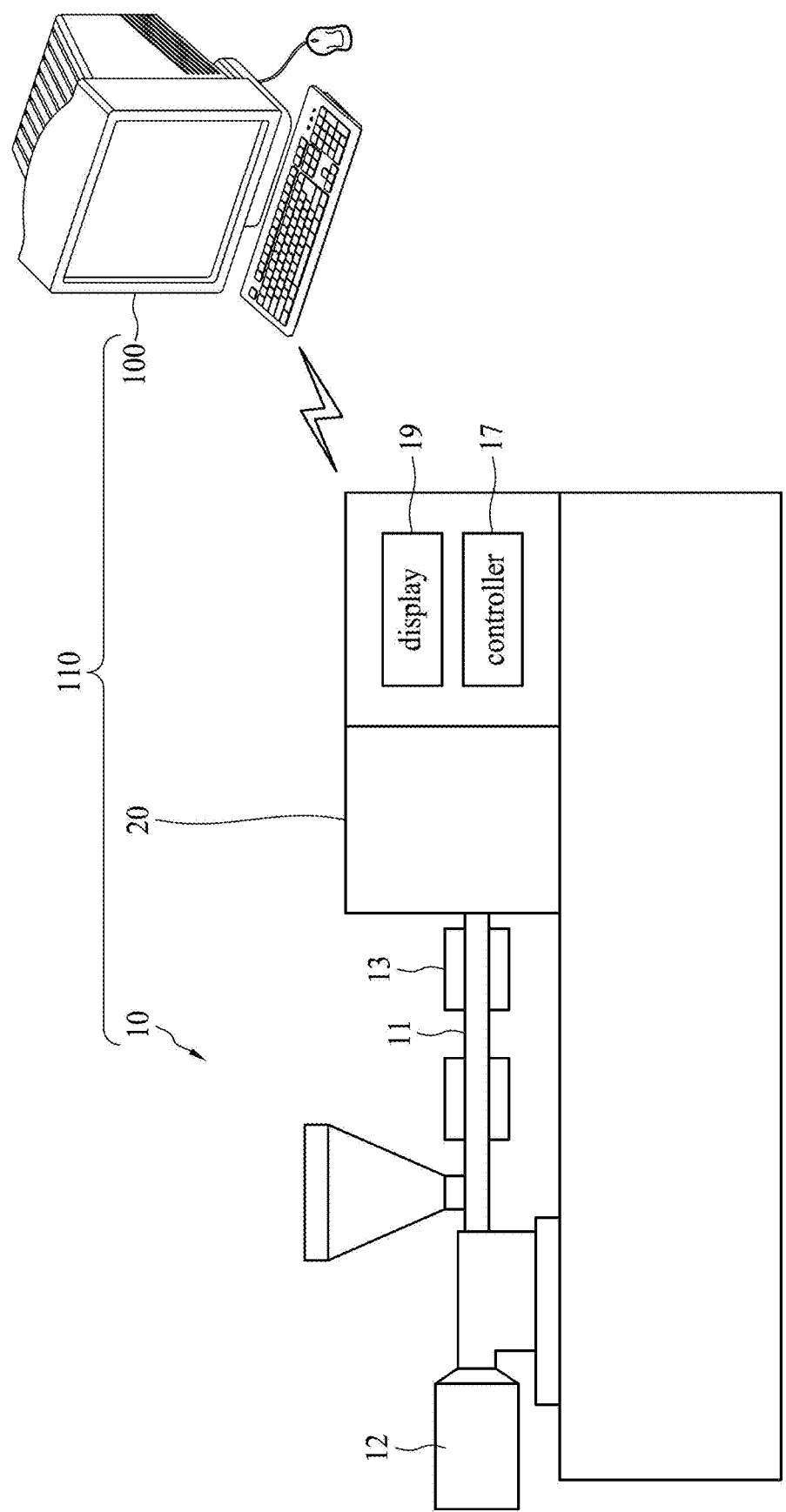
FIG. 1 is a schematic view of a molding system in accordance with some embodiments of the present disclosure.

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing an in-mold decorated article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

During a repetitive injection molding process, a molding material such as plastic resin, most often in the form of small beads or pellets, is introduced to an injection molding machine that melts the resin beads under heat, pressure, and shear. The molten resin is forcefully injected into a mold cavity having a particular cavity shape. The injected plastic molten resin is held under pressure in the mold cavity, cooled, and then removed as a solidified part having a shape that essentially duplicates the cavity shape of the mold.

A typical injection molding procedure comprises four basic operations: (1) heating the plastic resin in the injection molding machine to allow it to flow under pressure; (2) injecting the melted plastic resin into a mold cavity or cavities defined between two mold halves that have been closed; (3) allowing the plastic resin to cool and harden in the cavity or cavities while under pressure; and (4) opening the mold halves to cause the cooled part to be ejected from the mold. In the conventional injection molding of synthetic resin by an injection molding machine, the weight of the injected synthetic resin varies with the molten resin pressure, the molten resin specific volume, the molten resin temperature, and other molten resin conditions. Therefore, it is difficult to form products of a consistent quality.

Figure 2:
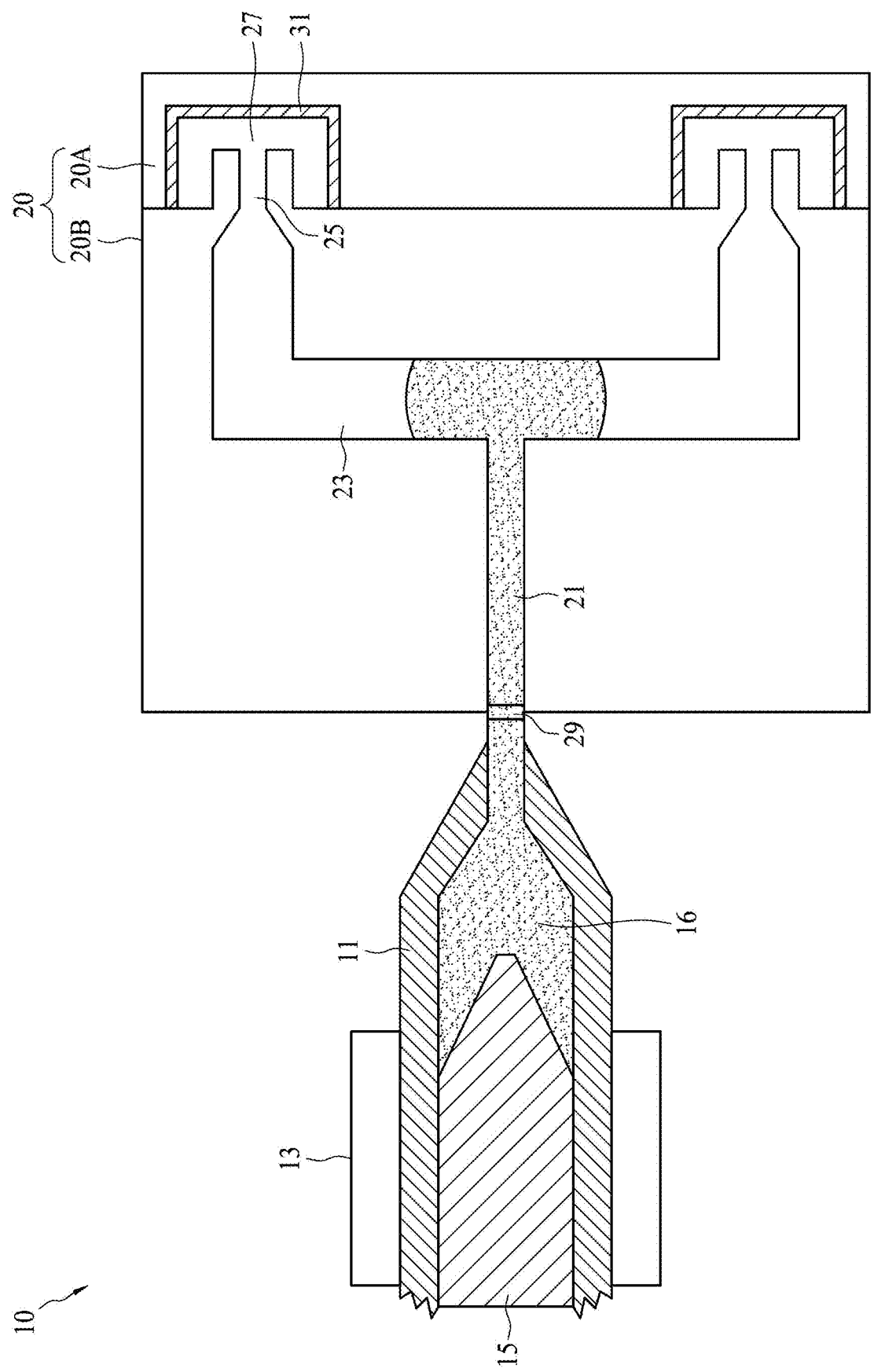
FIG. 2 is a close-up schematic view of the molding system in FIG. 1.

FIG. 1 is a schematic view of a molding system 110 in accordance with some embodiments of the present disclosure, and FIG. 2 is a close-up schematic view of the molding system 110 in FIG. 1. In some embodiments of the present disclosure, the molding system 110 is an injection molding system comprising a molding machine 10 such as an injection molding machine, a mold 20 disposed on the molding machine 10, and a computing apparatus 100 connected to the molding machine 10. In some embodiments of the present disclosure, the molding machine 10 includes a barrel 11 having a screw chamber, heating elements 13 configured to heat the screw chamber of the barrel 11, and a screw 15 positioned in the screw chamber of the barrel 11 and driven by a screw-driving motor 12 for feeding a molding material 16, such as thermoplastic molding resin, into a mold cavity 27 of the metal mold 20. In some embodiments of the present disclosure, the molding system 110 comprises a controller 17 configured to control the operation of the molding machine 10, and a display 19 configured to display information of the molding process. In some embodiments of the present disclosure, the controller 17 and the computing apparatus 100 implement a controlling module of the molding system 110.

In some embodiments of the present disclosure, the molding machine 10 is equipped with sensors for sensing the velocity of the screw 15, the pressure of the barrel 11 (the filling pressure in the filling stage and the packing pressure in the packing stage) and the temperature of the barrel 11 (the filling temperature in the filling stage and the packing temperature in the packing stage); and the computing apparatus 100 is programmed to acquire the velocity, pressure, and temperature data from the controller 17 through the association therebetween.

The metal mold 20 is constituted by a fixed-side metal mold 20A and a movable-side metal mold 20B. Inside the metal mold 20, a sprue portion 21, a runner portion 23, a gate portion 25 and a mold cavity 27 are formed so as to be arranged in the above-mentioned order from the molding machine 10. The sprue portion 21 of the metal mold 20 is connected to the barrel 11 of the molding machine 10 via a nozzle 29. A decorating film 31 is inserted into the mold cavity 27 before the molding material 16 is injected into the mold cavity 27.

Figure 3:
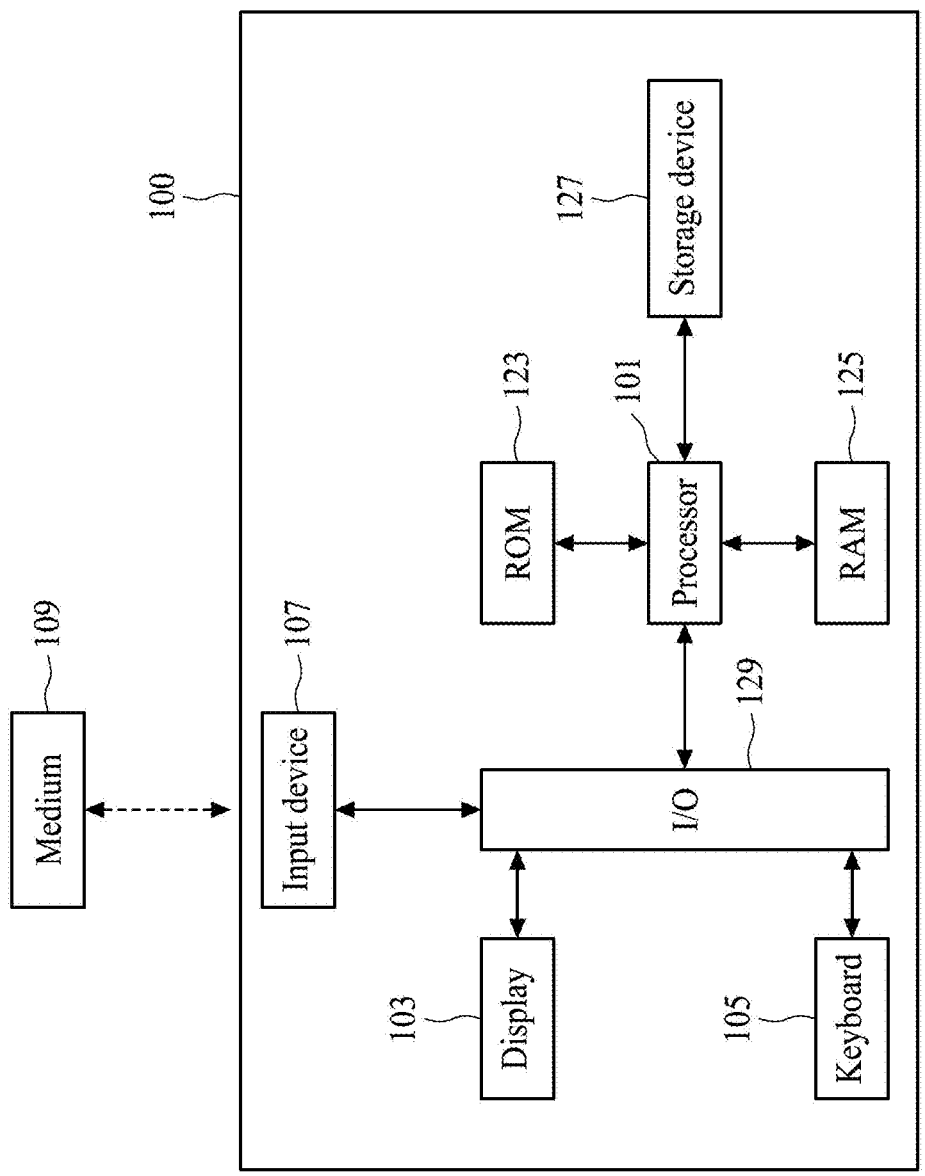
FIG. 3 is a functional block diagram of a computing apparatus in accordance with some embodiments of the present disclosure.

FIG. 3 is a functional block diagram of the computing apparatus 100 in accordance with some embodiments of the present disclosure. In some embodiments of the present disclosure, the computing apparatus 100 comprises a computer processor 101 for performing a computer-implemented injection molding method. In some embodiments of the present disclosure, the computing apparatus 100 includes a read-only memory (ROM) 123, a random access interface 129. The computer processor 101 operably communicates with the ROM 123, the RAM 125, the storage device 127, and the I/O interface 129.

In some embodiments of the present disclosure, the computing apparatus 100 may further include a display 103, a keyboard 105, and an input device 107, such as a card reader or an optical disk drive. The input device 107 is configured to input computer instructions (software algorithms) stored in a non-transitory computer-readable medium 109, and the computer processor 101 is configured to execute operations for performing a computer-implemented injection molding simulation method according to the computer instructions. The computer processor 101 reads software algorithms from the input device 107 or the storage device 127, executes the calculation steps, and stores the calculated result in the RAM 125. In some embodiments of the present disclosure, the memory devices, i.e., the ROM 123 and the RAM 125, can be programmed to store codes for performing the computer-implemented method.

Figure 4:
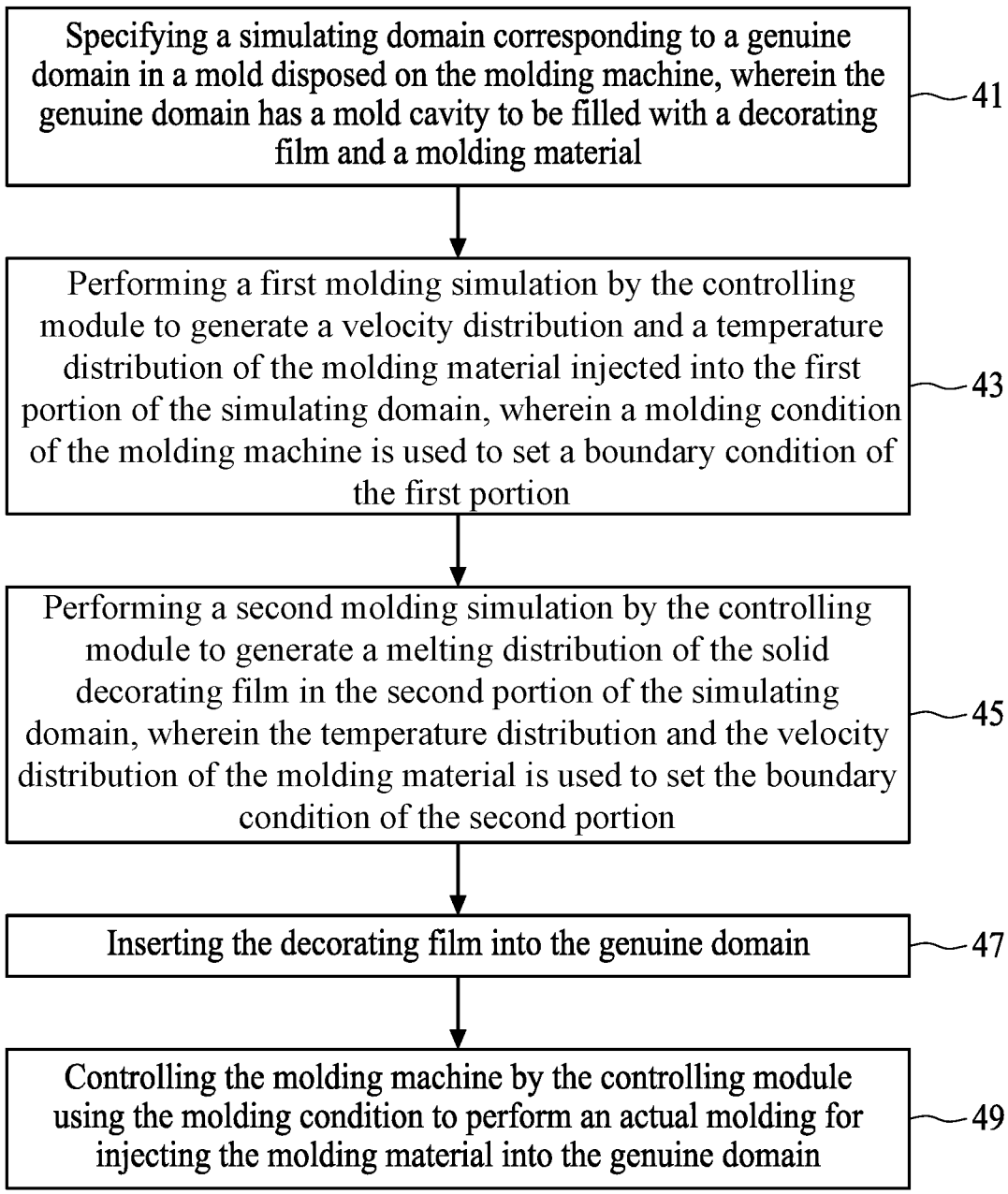
FIG. 4 is a flow chart of a method for preparing an in-mold decorating article in accordance with some embodiments of the present disclosure.

FIG. 4 is a flow chart of the method 40 for preparing an in-mold decorating article using a molding machine controlled by a controlling module connected to the molding machine in accordance with some embodiments of the present disclosure. The method comprises a step 41 of specifying a simulating domain corresponding to a genuine domain in a mold disposed on the molding machine, wherein the genuine domain has a mold cavity to be filled with a decorating film and a molding material, a step 43 of performing a first molding simulation executed on the controlling module to generate a velocity distribution and a temperature distribution of the molding material in a first portion of the simulating domain, wherein the first molding simulation is performed using a molding condition of the molding machine to set a boundary condition of the first portion; a step 45 of performing a second molding simulation executed on the controlling module to generate a melting distribution of the decorating film in a second portion of the simulating domain, wherein the second molding simulation is performed using the velocity distribution and the temperature distribution of the molding material to set a boundary condition of the second portion; a step 47 of inserting the decorating film into the second portion of the genuine domain; and a step 49 of controlling the molding machine by the controlling module using the molding condition to perform an actual molding for injecting the molding material into the first portion of the genuine domain.

The following describes an exemplary process flow of the injection molding simulation method 40 in accordance with some embodiments of the present disclosure.

Figure 5:
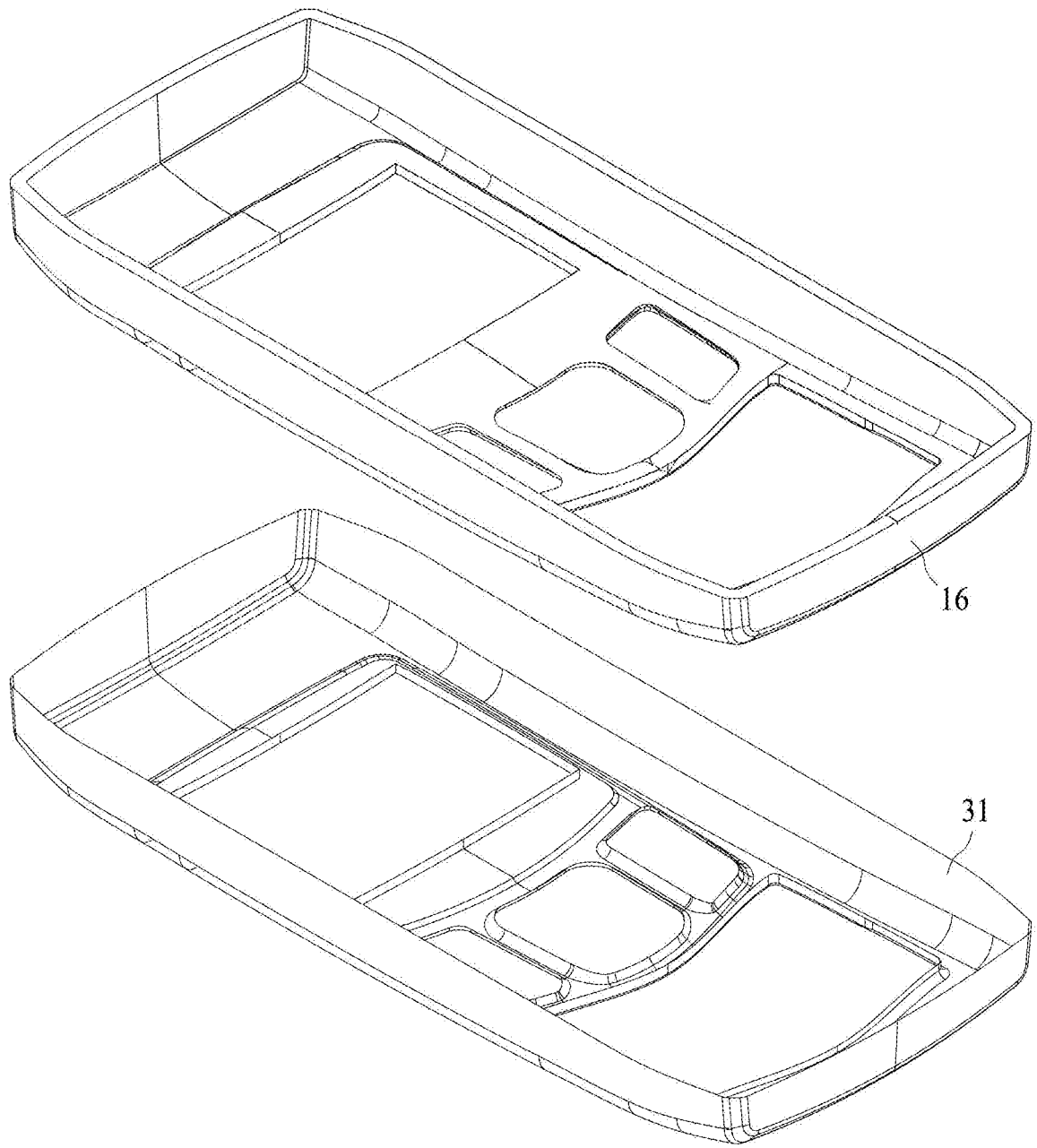
FIG. 5 is an exploded view of a genuine domain in accordance with some embodiments of the present disclosure.
Figure 6:
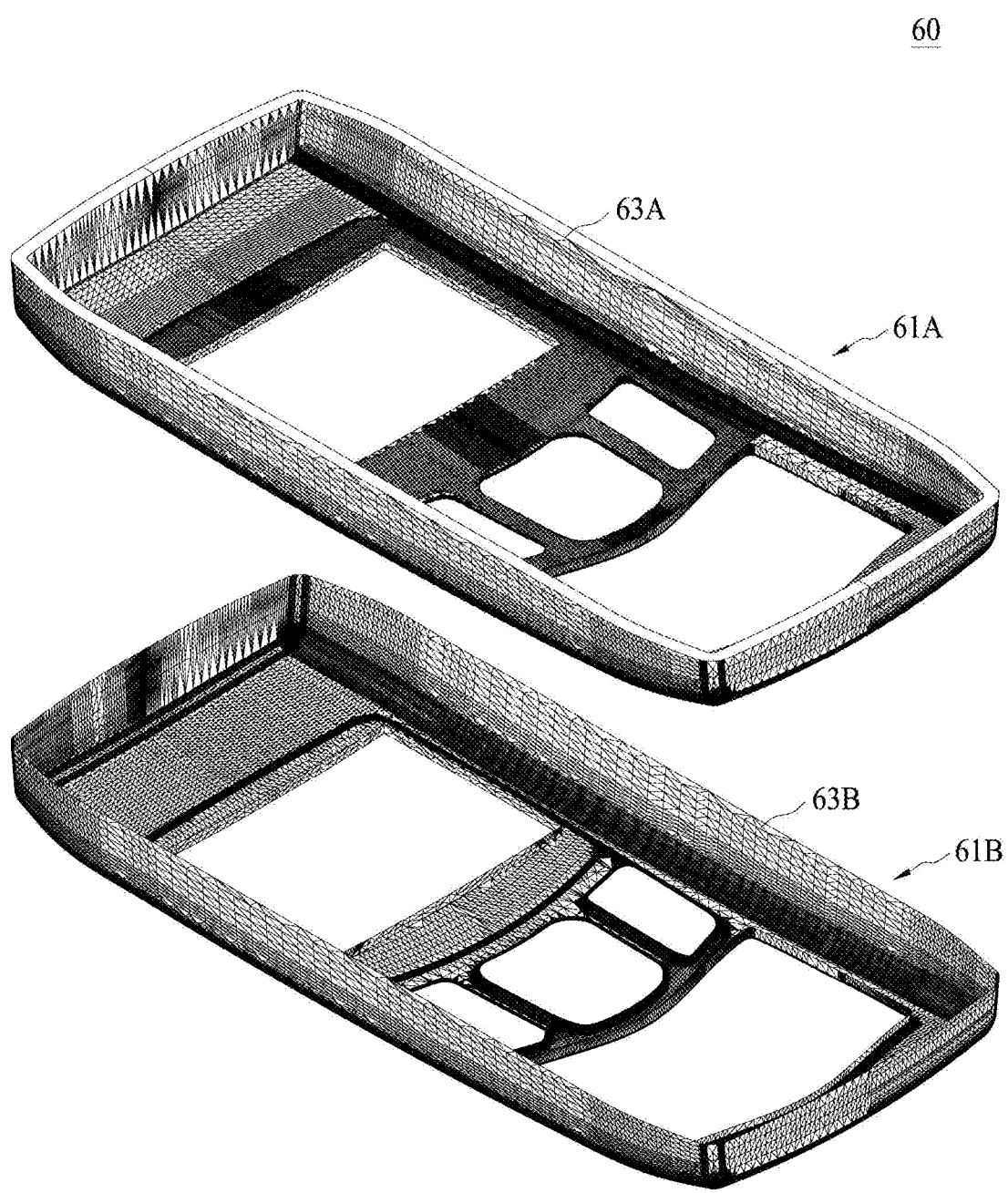
FIG. 6 is a schematic view of a simulating domain corresponding to the genuine domain in FIG. 5 in accordance with some embodiments of the present disclosure.

FIG. 5 is an exploded view of a genuine domain 50 in accordance with some embodiments of the present disclosure, and FIG. 6 is a schematic view of a simulating domain 60 corresponding to the genuine domain 50 in accordance with some embodiments of the present disclosure. Referring back to FIG. 2, the metal mold 20 may be divided into two parts: a metal part and a space part defined by the metal part. The genuine domain 50 in FIG. 5 is an example of a portion of the space part of the metal mold 20. In some embodiments of the present disclosure, the genuine domain 50 corresponds to the mold cavity 27 to be filled with the decorating film 31 and the molding material 16 so as to form the in-mold decorated article. In some embodiments of the present disclosure, the method 40 can begin with step 41 where a simulating domain 60 is specified. In some embodiments of the present disclosure, the simulating domain 60 is obtained from a CAD (Computer Aided Design) model used in design and development of the in-mold decorated article.

In some embodiments of the present disclosure, the simulating domain 60 includes a first portion 61A and a second portion 61B, wherein the first potion 61A corresponds to a portion of the mold cavity 27 to be filled with the molding material 16, and the second portion 61B corresponds to the portion of the genuine domain 50 (mold cavity 27) where the decorating film 31 is disposed. In some embodiments of the present disclosure, a mesh is created by dividing at least part of the simulating domain 60 before actually applying a numerical analysis, such as an FEM (finite element method), an FDM (finite difference method) or an FVM (finite volume method), to the simulating domain 60. The creation of the mesh for the simulating domain 60 uses a technique of modeling an object or fluid (molding material) region (i.e., the simulating domain 60 of the present embodiment) to be analyzed with a set of elements 63A in the first portion 61A and a set of elements 63B in the second portion 61B, such as rectangular mesh, hexahedral mesh or tetrahedral mesh, in order to perform the subsequent numerical analysis.

Figure 7:
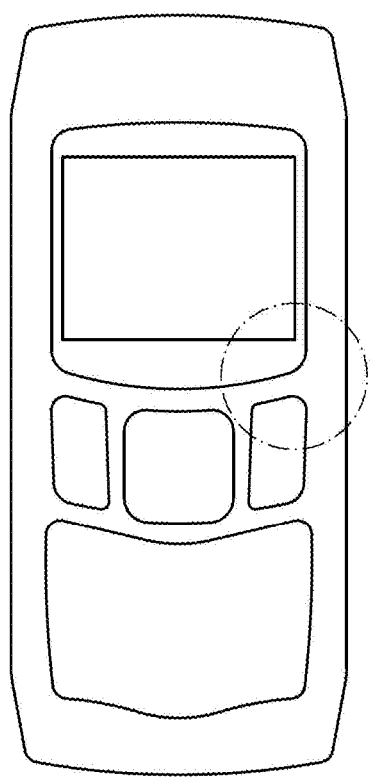
FIG. 7 is a top view of the simulating domain in FIG. 6
Figure 8:
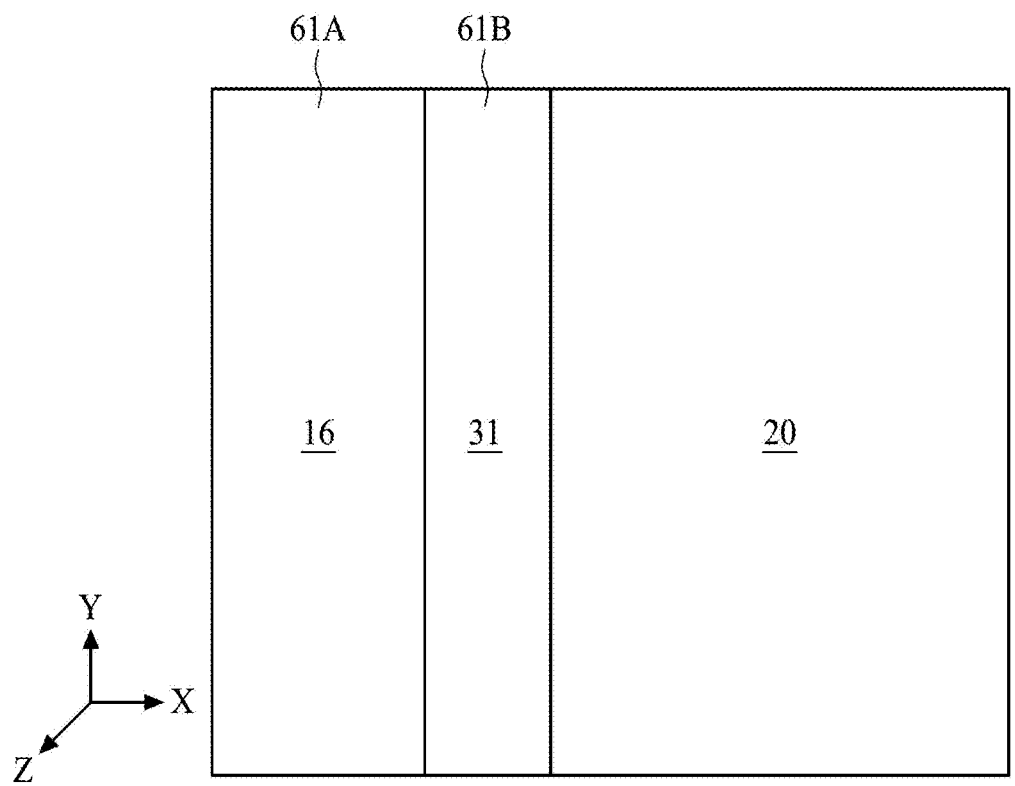
FIG. 8 is a schematic close-up view of a marked region in FIG. 7 in accordance with some embodiments of the present disclosure.
Figure 9:
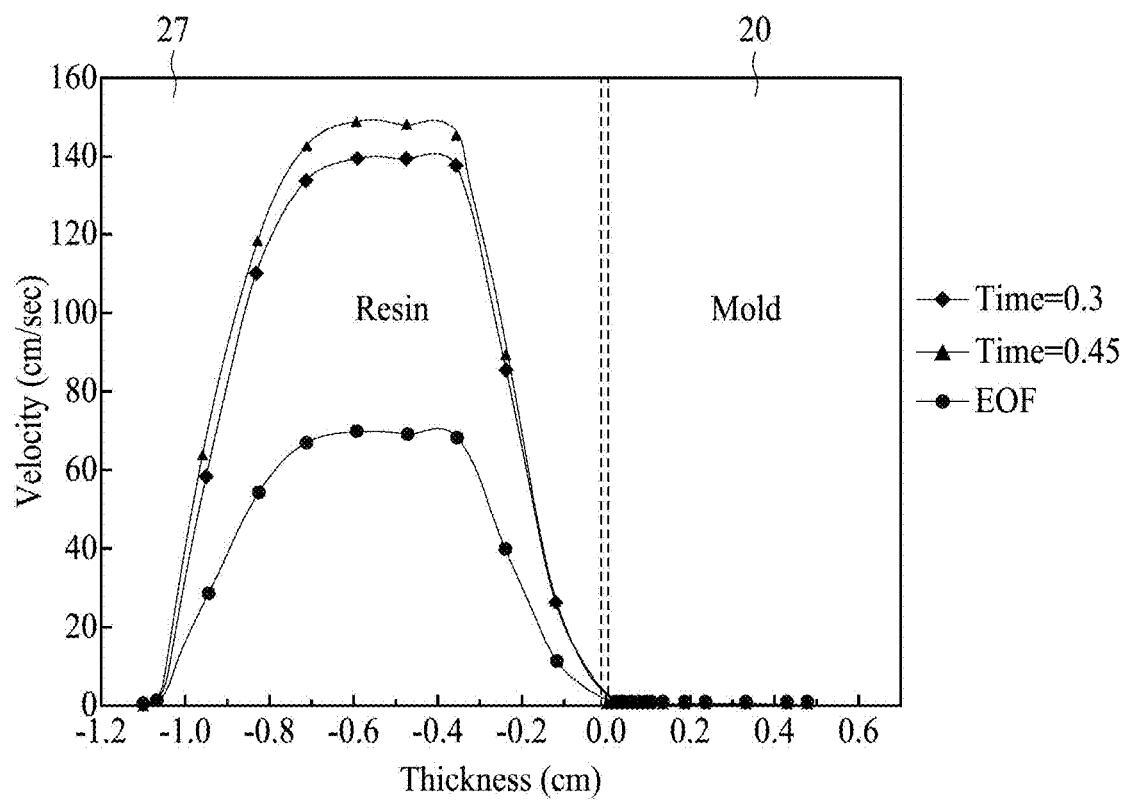
FIG. 9 is a plot of a simulated velocity distribution of the simulating domain at different times and FIG. 10 is a close-up plot of FIG. 9 in accordance with some embodiments of the present disclosure.
Figure 10:
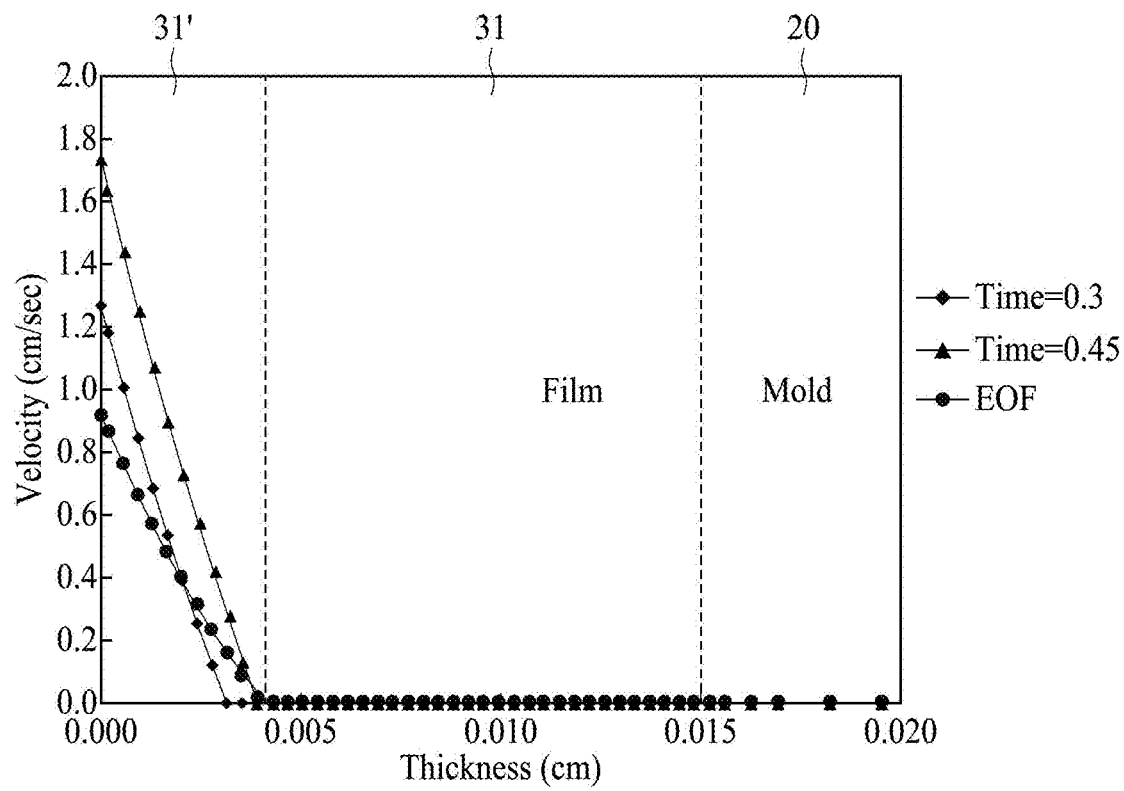

FIG. 7 is a top view of the simulating domain 60 and FIG. 8 is a schematic close-up view of a marked region with circle in FIG. 7 in accordance with some embodiments of the present disclosure. FIG. 9 is a plot of the simulated velocity distribution of the simulating domain 60 at different filling times (0.3 second, 0.45 second, and the end of filling) of the molding material 16 and FIG. 10 is a close-up plot of FIG. 9 in accordance with some embodiments of the present disclosure. In step 43, a first molding simulation is executed on the controlling module to generate a velocity distribution and a temperature distribution of the molding material 16 injected into the first portion 61A of the simulating domain 60 (the left part in FIG. 9), assuming the decorating film 31 is disposed in the second portion 61B.

In some embodiments of the present disclosure, the first molding simulation is performed using a molding condition or the molding machine 20 to set a boundary condition of the first portion 61A. In some embodiments of the present disclosure, the molding condition includes mold temperature, resin temperature, injection pressure, injection time (or speed), packing pressure, packing time, etc. In some embodiments of the present disclosure, during the first molding simulation, the velocity of the second portion 61B at the interface with the first portion 61A is used to set the velocity (boundary condition) of the first portion 61A, wherein the initial velocity of the second portion 61B is set to be zero (no movement).

The molding phenomena of the molding material 16 injected into the first portion 61A can be simulated using the following governing equations (1)-(3):

$$\frac{\partial \rho}{\partial t} + \nabla \cdot \rho v = 0 \quad (1)$$

$$\frac{\partial}{\partial t}(\rho v) + \nabla \cdot (\rho v v + \tau) = -\nabla p \quad (2)$$

$$\rho C_P \frac{\partial}{\partial t}(T) = k\nabla^2 T + \eta \dot{\gamma} \quad (3)$$

where ρ represents the density, t represents time, v represents the velocity vector (flow velocity), τ represents the total stress tensor, p represents the pressure, T represents the temperature, $C_p$ represents the specific heat, k represents the thermal conductivity, η represents the viscosity, and γ̇ represents the shear rate.

Solving the governing equations (1)-(3) requires a transient to state analysis, which can be performed numerically using a computer. See, for example, Rong-yeu Chang and Wen-hsien Yang, "Numerical simulation of mold filling in injection molding using a three-dimensional finite volume approach", International Journal for Numerical Methods in Fluids Volume 37, Issue 2, pages 125-148, Sep. 30, 2001, the entirety of which is incorporated herein by reference. During the transient state analysis, the process variables that change with time are not zero; i.e., the partial derivatives (∂/∂t) in the governing equations (1)-(3) are not considered zero.

Figure 11:
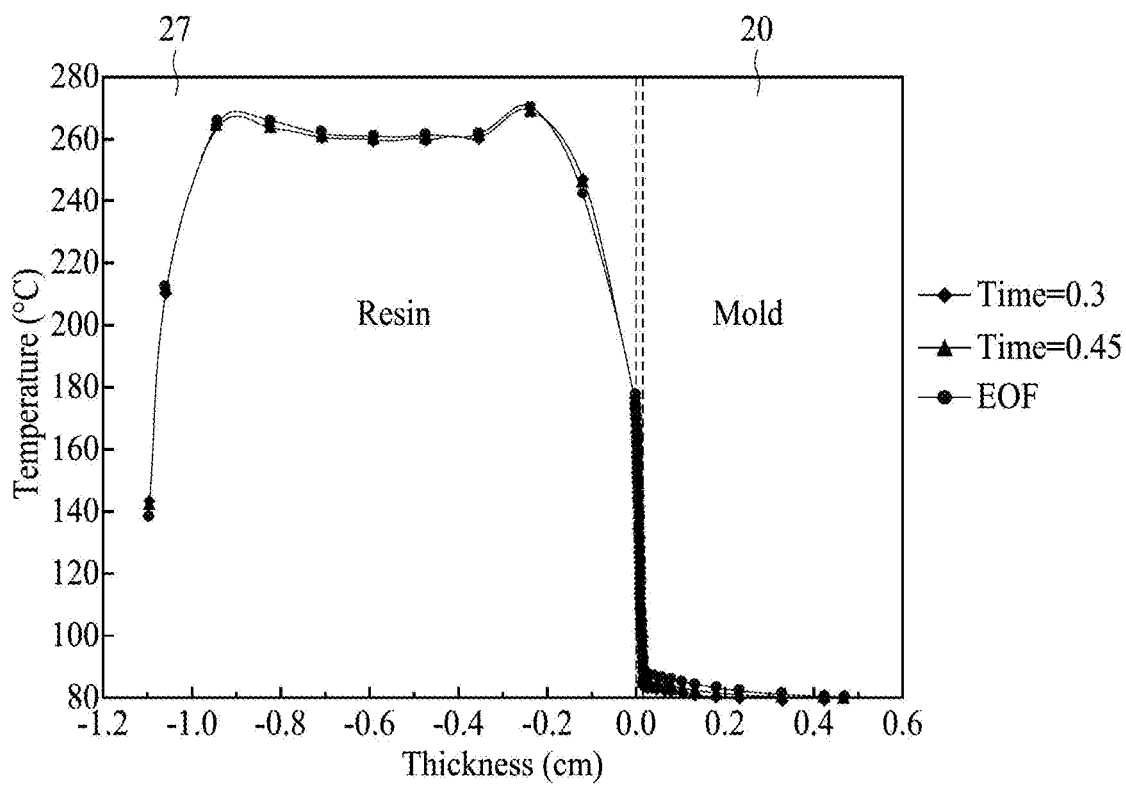
FIG. 11 is a plot of a simulated temperature distribution of the simulating domain and FIG. 12 is a close-up plot of FIG. 11 in accordance with some embodiments of the present disclosure.
Figure 12:
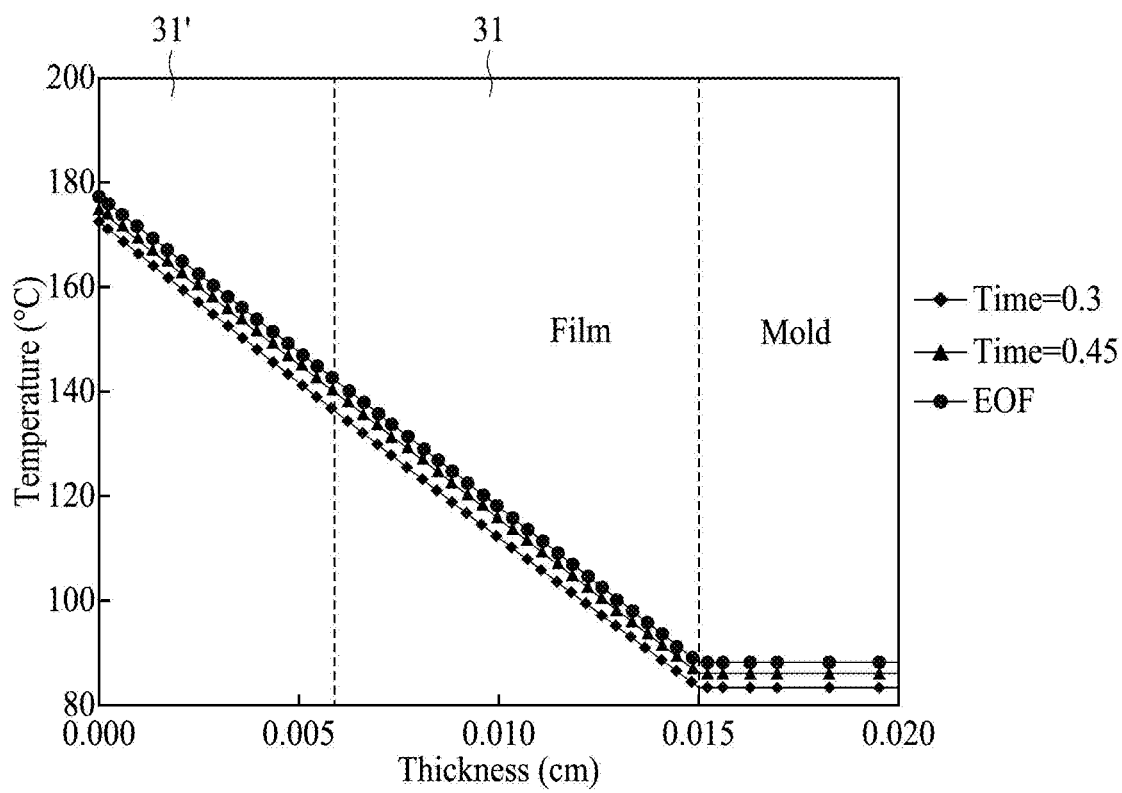

FIG. 11 is a plot of the simulated temperature distribution of the simulating domain 60 and FIG. 12 is a close-up plot of FIG. 11 in accordance with some embodiments of the present disclosure. Solving the governing equations (1)-(3) also generates a temperature distribution of the molding material 16 injected into the first portion 61A of the simulating domain 60 (the left part in FIG. 11), in addition to generating the velocity distribution.

In step 45, a second molding simulation is executed on the controlling module to generate a melting distribution of the solid decorating film 31 in a second portion 61B of the simulating domain 60 (the left part in FIG. 10). In some embodiments of the present disclosure, during the second molding simulation, the temperature distribution and the velocity distribution of the first portion 61A at the interface with the second portion 61B is used to set the velocity (boundary condition) of the second portion 61B, and the temperature distribution of the first portion 61A at the interface with the second portion 61 is used to set the temperature distribution (boundary condition) of the second portion 61B.

During the injection molding, the fluid molding material 16 (melted polymer at high temperature) flows into the mold cavity 27. When the hot molding material 16 comes into contact with the solid decorating film 31 in the mold cavity 27, heat is transferred from the hot molding material 16 to the solid decorating film 31, which forms a melted portion 31' of the solid decorating film 31, and the melted portion 31' adheres to the molding material 16. After cooling, the solid decoration film 31 is affixed to the cooled molding material 16.

In some embodiments, the velocity of the solid decorating film 31 is considered to be substantially zero in the solid state. In some embodiments, the solid decorating film 31 is considered to have transformed from the solid state to the melted state if the velocity is substantially non-zero, and a corresponding melted portion 31' with a thickness of 0.004 cm is depicted in FIG. 10. In other words, a portion (melted portion 31') of the decorating film 31 is deemed to be melted, while the other portion remains solid, and the present disclosure can generate the melting distribution of the decorating film 31. Referring to FIG. 10, the velocity distribution of the decorating film 31 expresses a velocity variation of the melted portion 31' of the decorating film 31 along a thickness direction with respect to a filling time of the molding material 16.

Figure 13:
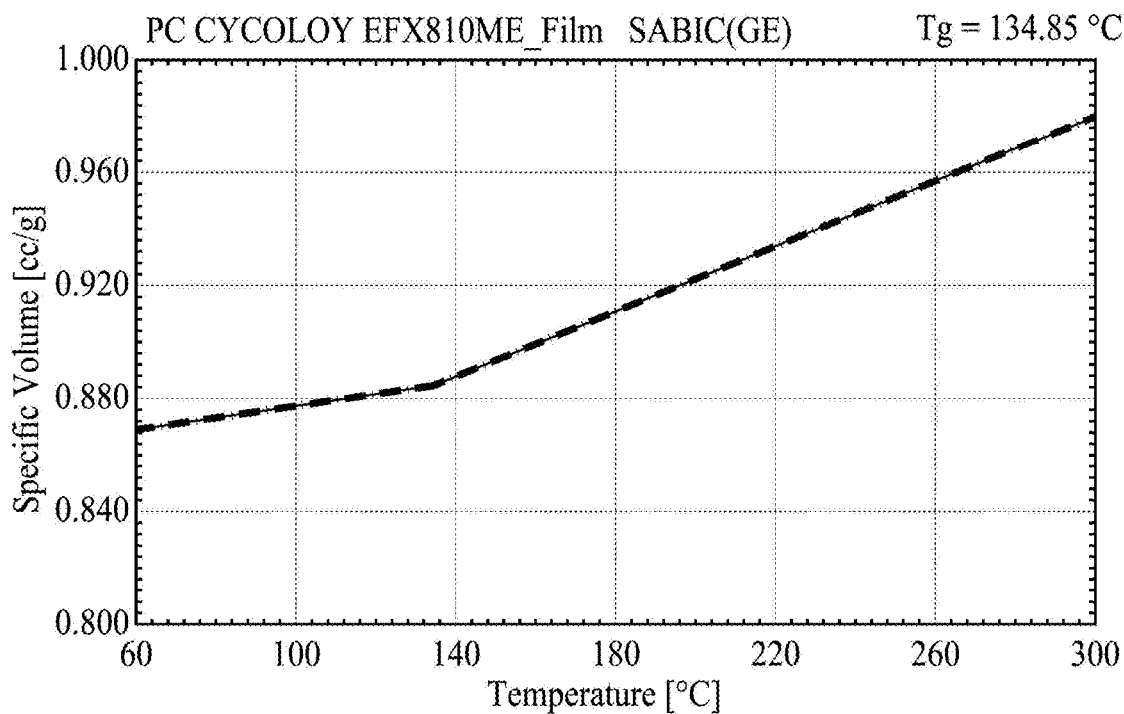
FIG. 13 is a schematic plot showing a state waveform polycarbonate (PC) of the decorating film in accordance with some embodiments of the present disclosure.

FIG. 13 is a schematic plot showing a state waveform polycarbonate (PC) of the decorating film 31 in accordance with some embodiments of the present disclosure. In some embodiments, the solid decorating film 31 is made of polycarbonate (PC); the state waveform of polycarbonate (PC) shows a glass transition temperature (Tg), and the solid decorating film 31 is in a solid state at temperatures below Tg and in a melted state at temperatures above Tg. In some embodiments, the solid decorating film 31 is considered to have transformed from the solid state to the melted state at temperatures above Tg. FIG. 12 shows a melted portion 31' of 0.006 cm. In other words, a portion (melted portion 31') of the decorating film 31 is deemed to be melted, while the other portion remains solid. The present disclosure can generate the melting distribution of the decorating film 31. Referring to FIG. 12, the temperature distribution of the decorating film 31 expresses a temperature variation of the melted portion 31' of the decorating film 31 along a thickness direction with respect to a filling time of the molding material 16.

In some embodiments of the present disclosure, the second molding simulation is performed by setting a zero-velocity boundary condition of the second portion 61B along a first direction (X-direction in FIG. 8, i.e., the thickness direction) substantially perpendicular to a flow direction (Y-direction in FIG. 8) of the molding material 16, i.e., assuming $V_x(x,t)=0$. In some embodiments of the present disclosure, the second molding simulation is performed by further setting a zero-velocity boundary condition of the second portion 61B along a second direction (Z-direction in FIG. 8) substantially perpendicular to the first direction and to the flow direction of the molding material 61B, i.e., assuming $V_z(x,0)=0$. Consequently, the governing equations (1)-(3) for simulating the molding phenomena of the second portion 61B (decorating film 31 in the second portion 61B) can be simplified as follows:

$$\frac{\partial \rho}{\partial t} + \left(\frac{\partial}{\partial y}\rho v_y\right) = 0 \quad (4)$$

$$\frac{\partial}{\partial t}(\rho v_y) + \left(\frac{\partial}{\partial y}\rho v_y v_y\right) + \frac{\partial}{\partial x}\tau_{xy} = 0 \quad (5)$$

$$(\rho C_P)\frac{\partial T}{\partial t} = \frac{\partial}{\partial x}\left(k\frac{\partial T}{\partial x}\right) \quad (6)$$

The first molding simulation and the second molding simulation are repeated to complete the injection of the molding material 16 into the mold cavity 27, and FIGS. 9 to 12 illustrate several velocity and temperature distributions at different times. In some embodiments of the present disclosure, the first molding simulation is repeated using the velocity distribution of the second portion 61B (decorating film 31) obtained in step 45 to set the boundary condition (velocity) of the first portion 61A at the interface with the second portion 61B. In some embodiments of the present disclosure, the second molding simulation is repeated using the velocity distribution of the first portion 61A (molding material 16) obtained in step 43 to set the boundary condition (velocity) of the second portion 61B at the interface with the first portion 61A. In some embodiments of the present disclosure, solving the governing equations (4)-(6) also generates a temperature distribution of the decorating film 31 in the second portion 61B of the simulating domain 60 (the left part in FIG. 12), in addition to generating the velocity distribution.

Figure 14:
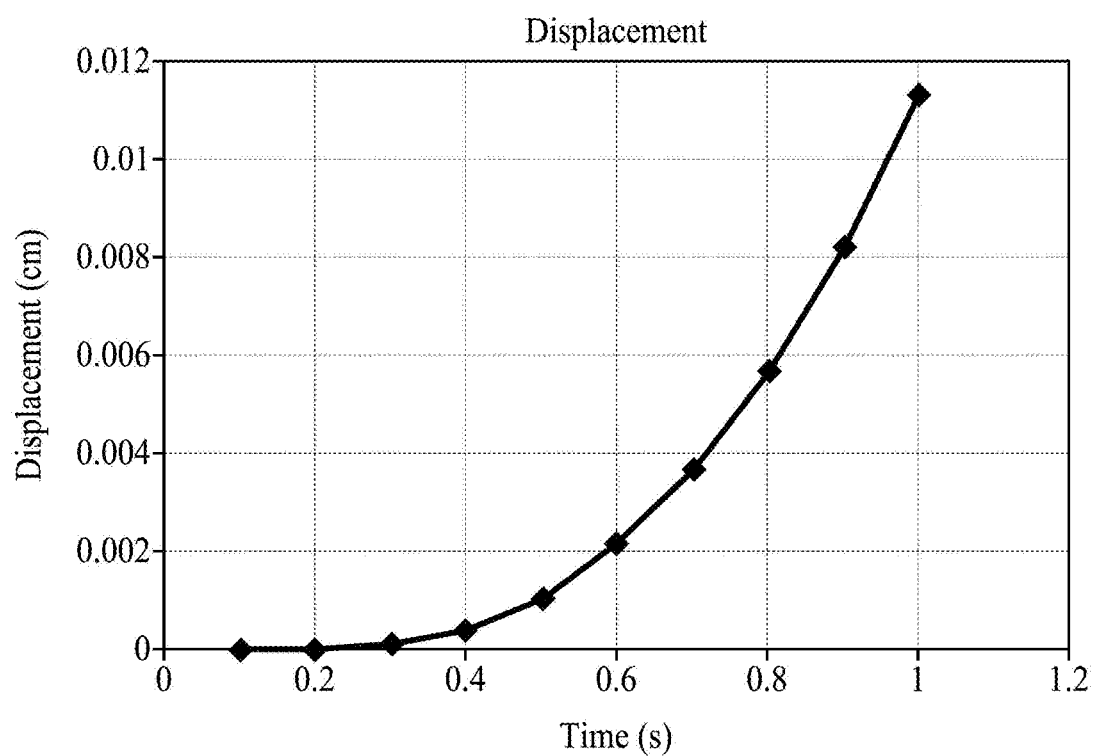
FIG. 14 is a plot of a bulk displacement of decorating film after the injection of the molding material into the mold cavity in accordance with some embodiments of the present disclosure.
Figure 15:
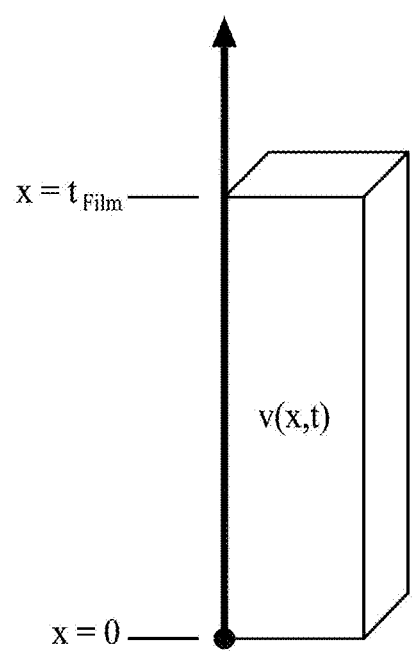
FIG. 15 is a schematic diagram showing the model for evaluating the bulk displacement of the decorating film in accordance with some embodiments of the present disclosure.

FIG. 14 is a plot of the bulk displacement of the decorating film 31 after the injection of the molding material 16 into the mold cavity 27 in accordance with some embodiments of the present disclosure, and FIG. 15 is a schematic diagram showing the model for evaluating the bulk displacement of the decorating film 31 in accordance with some embodiments of the present disclosure. After completion of the molding simulation of the molding material 16 being injected into the mold cavity 27, the bulk displacement of the decorating film 31 can be evaluated using the velocity distribution of the second portion 61B (the decorating film 31).

In some embodiments of the present disclosure, the bulk displacement (BD) of the decorating film 31 can be evaluated using the following equation (7):

$$BD = \int_{t=0}^{t=EOF} \frac{1}{t_{Film}} \left( \int_{x=0}^{x=t_{Film}} v(x,t)dx \right) dt \quad (7)$$

$$= \frac{1}{t_{Film}} \int_{t=0}^{t=EOF} \int_{x=0}^{x=t_{Film}} v(x,t)dxdt$$

Where EOF represents the end of filling, t represents time, v(x,t) represents the velocity, and $t_{Film}$ represents the thickness of the decorating film 31. In some embodiments of the present disclosure, if the bulk displacement exceeds a predetermined value, then the decorating film 31 is considered moving away from the design position, the corresponding molding condition is considered an inappropriate one, a new molding condition is used to set the molding condition of the molding machine 10 and the computing apparatus 100 performs the molding simulation until the bulk displacement does not exceed the predetermined value.

In some embodiments of the present disclosure, after obtaining the molding condition of the molding machine 10 with acceptable bulk displacement, in step 47 of the method 40, the decorating film 31 is inserted into the inner wall of the mold cavity 27 (a portion of the genuine domain 50 corresponding to the second portion 61B); and in step 49 of the method 40, the molding machine 10 is controlled by the controlling module using the molding condition to perform an actual molding for injecting the molding material 16 into the mold cavity 27 (a portion of the genuine domain 50 corresponding to the first portion 61A).

Figure 16:
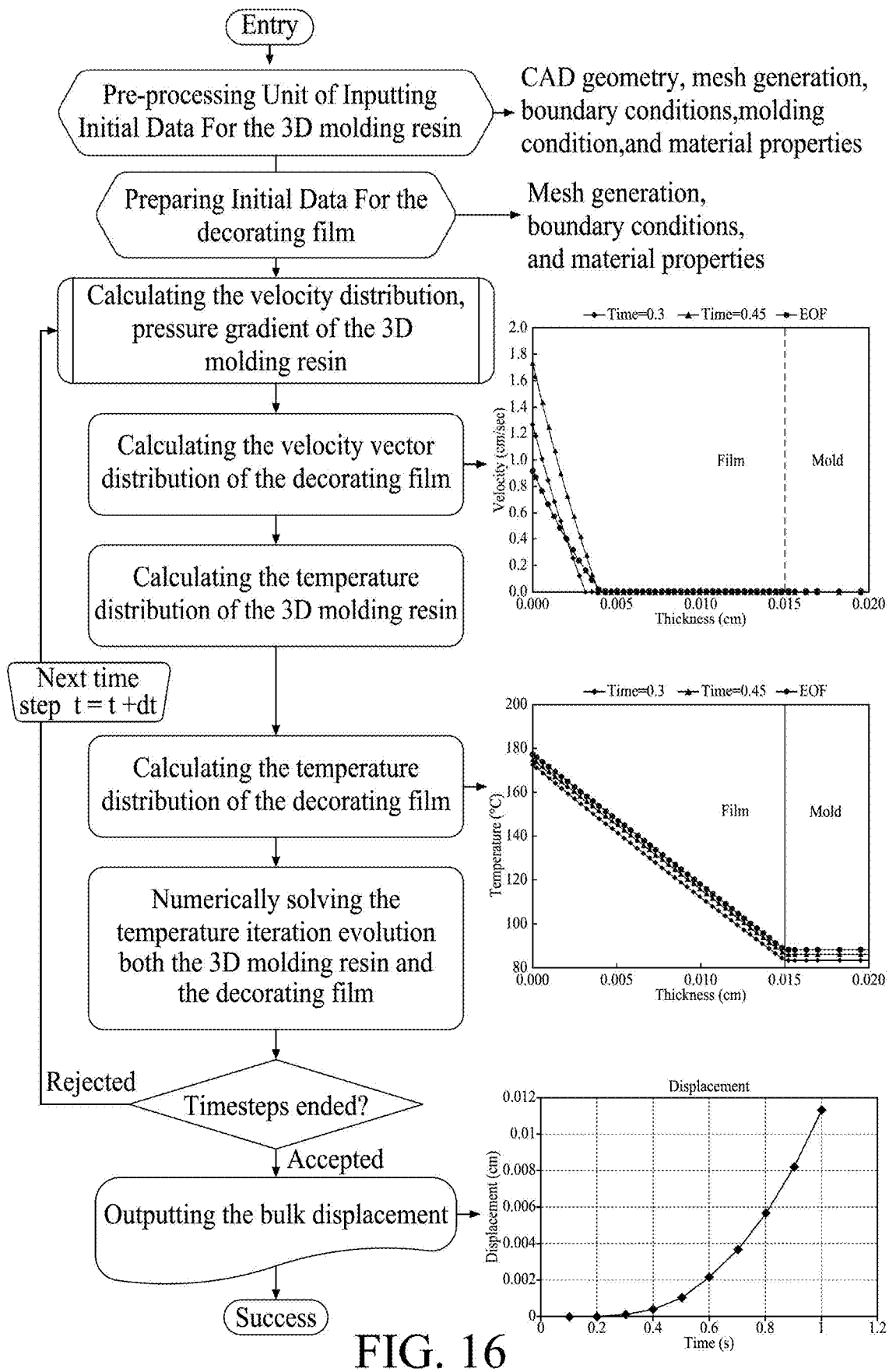
FIG. 16 is a flowchart of the CAE software for simulating the molding of the in-mold decorated article in accordance with some embodiments of the present disclosure.

FIG. 16 is a flowchart of the CAE software for simulating the molding of the in-mold decorated article in accordance with some embodiments of the present disclosure. As shown in FIG. 16, the CAE software for injection molding can offer a velocity distribution of the decorating film 31 for the subsequent displacement analysis. Thus, the displacement analysis of the decorating film 31 during the injection of the molding material 16 is feasible before actually injecting the molding material 16 into the mold cavity 27.

Figure 17:
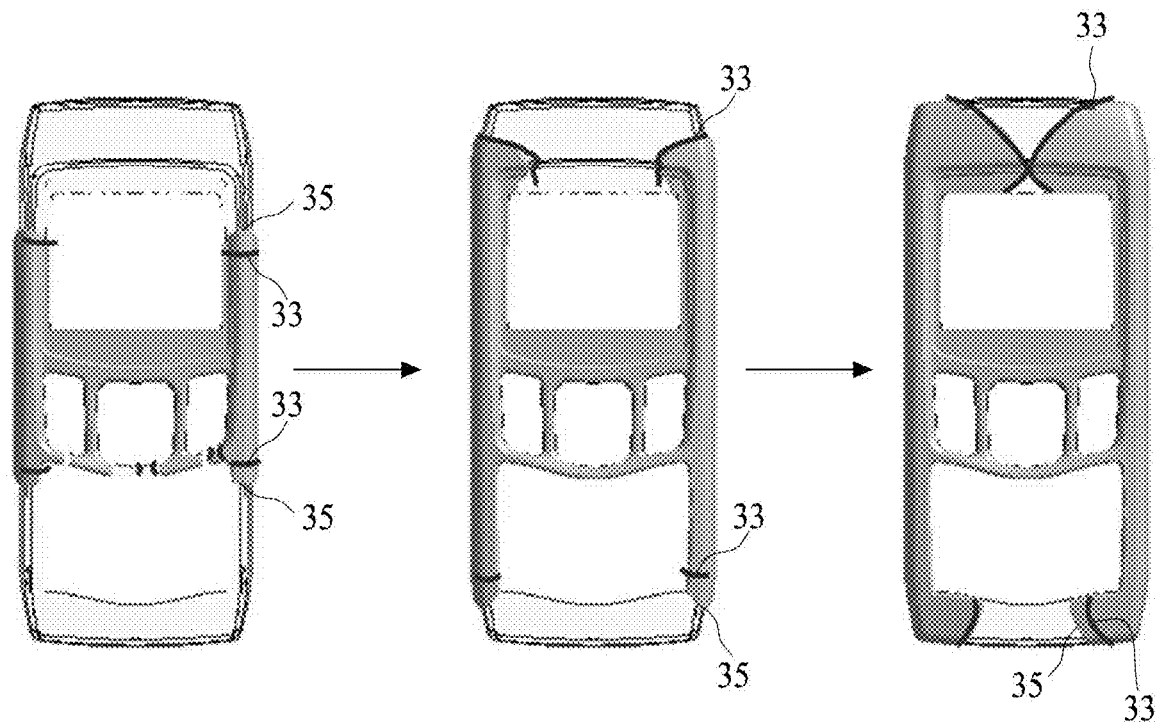
FIG. 17 is a comparative diagram showing the simulated and the experimental melt fronts after the mold cavity is partially filled by the molding material at different filling times.
Figure 18:
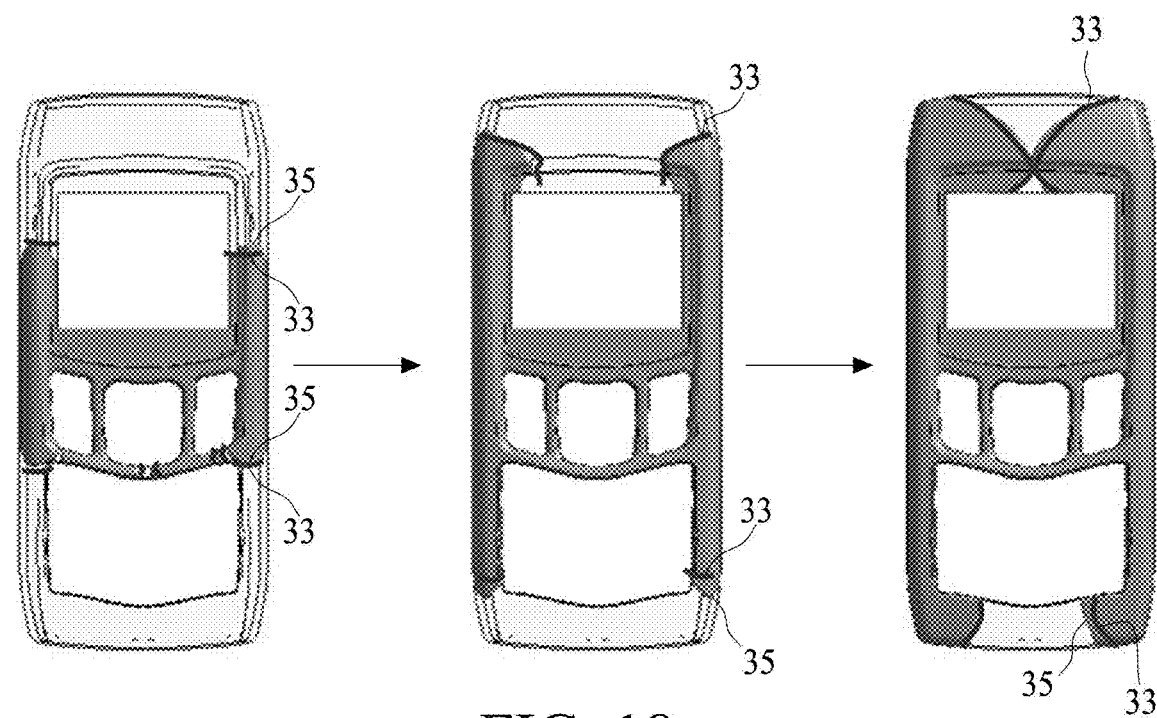
FIG. 18 is an exemplary diagram showing the simulated and the experimental melt fronts after the mold cavity is partially filled by the molding material at different filling times in accordance with some embodiments of the present disclosure.

FIG. 17 is a comparative diagram showing the simulated and experimental melt fronts after the mold cavity 27 is partially filled by the molding material 16 at different filling times (50%, 75%, 89%) using a full simulation method with non-simplified governing equations (1)-(3) for the decorating film 31. FIG. 18 is an exemplary diagram showing the simulated and experimental melt fronts after the mold cavity 27 is partially filled by the molding material 16 at different filling times (50%, 72.9%, 85.6%) using a composite simulation method with the simplified governing equations (4)-(6) for the decorating film 31 in accordance with some embodiments of the present disclosure.

The molding material 16 entering the mold cavity 27 through the gate portion 25 forms a plurality of flow streams with each having a melt front. As clearly shown in FIG. 17 and FIG. 18, the position differences between the simulated melt fronts 35 and the experimental melt fronts 33 in FIG. 17 are larger than those in FIG. 18. In other words, the exemplary embodiment in FIG. 18 of the present disclosure using the simplified governing equations (4)-(6) for the decorating film 31 can more accurately simulate the molding phenomena of the molding material 16 as it is injected into the mold cavity 27 to prepare the in-mold decorated article, as compared to the comparative embodiment in FIG. 17.

By assuming the movement of the decorating film 31 along the directions perpendicular to the flow direction is zero, i.e., $V_x(x,t)=0$ and $V_z(x,0)=0$, the embodiments of the present disclosure simplify the numerical solving of the governing equations for the decorating film 31. The following table shows the computing time (CPU time) of the second portion 61 of the simulating domain 60 using the composite simulation method (using the simplified governing equations (4)-(6) for the decorating film 31) and the conventional full simulation method (using the non-simplified governing equations (1)-(3) for the decorating film 31). Compared to the conventional full simulation method, the computing time can be dramatically decreased by using the composite simulation method according to some embodiments of the present disclosure.

|  | Pre-process (Mesh generation) | Analysis (Numerical solving) |
| --- | --- | --- |
| Full simulation method | ~1800 seconds | 2183 seconds |
| Composite simulation method | ~300 seconds | 1975 seconds |

Generally, the molding simulation is applied to the fluid molding material, e.g., to simulate the flow phenomena of the fluid molding material, and does not be applied to the solid. In contrast, the present disclosure applies the molding simulation to the solid decorating film, e.g., to implement the simulation of the melting phenomena of the solid decorating film.

Before the hot and fluid molding material is injected into the mold cavity, the decorating film in the mold cavity is in the solid state, not in the fluid state; it is common knowledge that solid material, such as the decorating film, does not flow like a fluid. The present disclosure uses the feature of performing a second molding simulation to generate a melting distribution of the solid decorating film due to the heat transfer from the hot molding material. In addition, the present disclosure uses the feature of performing a second molding simulation to generate a velocity distribution of the solid decorating film due to the heat transfer from the hot molding material.

One aspect of the present disclosure provides a method for preparing an in-mold decorated article using a molding machine controlled by a controlling module connected to the molding machine. In some embodiments of the present disclosure, the method for preparing an in-mold decorated article comprises steps of: specifying a simulating domain corresponding to a genuine domain in a mold disposed on the molding machine, wherein the genuine domain has a mold cavity to be filled with a decorating film and a molding material; performing a first molding simulation executed on the controlling module to generate a velocity distribution of the molding material in a first portion of the simulating domain, wherein the first molding simulation is performed using a molding condition of the molding machine to set a boundary condition of the first portion; performing a second molding simulation executed on the controlling module to generate a velocity distribution of the decorating film in a second portion of the simulating domain, wherein the second molding simulation is performed using the velocity distribution of the molding material to set a boundary condition of the second portion; inserting the decorating film into the second portion of the genuine domain; and controlling the molding machine by the controlling module using the molding condition, to perform an actual molding for injecting the molding material into the first portion of the genuine domain.

Another aspect of the present disclosure provides a non-transitory computer medium containing computer instructions stored therein for causing a computer processor to perform operations for preparing an in-mold decorated article using a molding machine. In some embodiments of the present disclosure, the operations comprise steps of: specifying a simulating domain corresponding to a genuine domain in a mold disposed on the molding machine, wherein the genuine domain has a mold cavity to be filled with a decorating film and a molding material; performing a first molding simulation executed on the controlling module to generate a velocity distribution of the molding material in a first portion of the simulating domain, wherein the first molding simulation is performed using a molding condition of the molding machine to set a boundary condition of the first portion; performing a second molding simulation executed on the controlling module to generate a velocity distribution of the decorating film in a second portion of the simulating domain, wherein the second molding simulation is performed using the velocity distribution of the molding material to set a boundary condition of the second portion; and controlling the molding machine by the controlling module using the molding condition to perform an actual molding for injecting the molding material into the first portion of the genuine domain, wherein the decorating film is inserted into the mold cavity before the actual molding.

Another aspect of the present disclosure provides a molding system for preparing an in-mold decorated article. In some embodiments of the present disclosure, the molding system comprises a mold having a mold cavity; a molding machine configured to fill the mold cavity with a molding material and a decorating film; a computing apparatus connected to the molding machine; and a controller connected to the computing apparatus. In some embodiments of the present disclosure, the computing apparatus is programmed to perform operations comprising steps of specifying a simulating domain corresponding to a genuine domain in a mold disposed on the molding machine, wherein the genuine domain has a mold cavity to be filled with a decorating film and a molding material; performing a first molding simulation to generate a velocity distribution of the molding material in a first portion of the simulating domain, wherein the first molding simulation is performed using a molding condition of the molding machine to set a boundary condition of the first portion; and performing a second molding simulation to generate a velocity distribution of the decorating film in a second portion of the simulating domain, wherein the second molding simulation is performed using the velocity distribution of the molding material to set a boundary condition of the second portion. In some embodiments of the present disclosure, the controller is configured to control the molding machine with the molding condition to perform an actual molding for injecting the molding material into the mold cavity, wherein the decorating film is inserted into the mold cavity before the actual molding.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A molding system for preparing an in-mold decorated article, comprising:
   a mold having a mold cavity, wherein a decorating film is disposed in the mold cavity;
   a molding machine configured to fill the mold cavity with a fluid molding material, wherein the molding machine comprises a barrel, a plurality of heat elements configured to heat the barrel, a screw positioned in the barrel, and a screw-driving motor configured to drive the screw to feed the molding fluid molding material into the mold cavity, under heat and pressure;
   a controller configured to control heat and pressure of the molding machine by tuning the heat elements and the screw-driving motor; and a computing apparatus operably communicating with the controller, wherein the computing apparatus is programmed to perform operations comprising steps of:

specifying a simulating domain corresponding to a genuine domain in the mold disposed on the molding machine;

performing a first molding simulation to generate a temperature distribution and a velocity distribution of the fluid molding material in a first portion of the simulating domain, wherein the first molding simulation is performed using a molding condition of the molding machine to set a boundary condition of the first portion, corresponding to a portion of the mold cavity to be filled with the fluid molding material; and performing a second molding simulation, using the temperature distribution and the velocity distribution of the fluid molding material in the first portion of the simulating domain, to set a boundary condition of the decorating film in a second portion of the simulating domain, thereby generating a temperature distribution of the decorating film along a thickness direction and then generating a velocity distribution of a portion of the decorating film where the fluid molding material comes into contact and transformed from a solid state at temperatures below a glass transition temperature of the decorating film to a melted state at temperatures above the glass transition temperature, the temperature distribution in the second portion of the simulating domain expresses a temperature variation of the decorating film relative to a filling time of the fluid molding material, and the velocity distribution in the second portion of the simulating domain expresses a velocity variation greater than 0 of the portion of the decorating film relative to the filling time of the molding material, wherein the controller operates the molding machine with the molding condition to perform an actual molding for injecting the fluid molding material into the mold cavity, and the decorating film is inserted into the mold cavity before the actual molding.

2. The molding system of claim 1, wherein the computing apparatus is programmed to further perform a step of repeating the first molding simulation using the melting distribution of the decorating film to set the boundary condition of the first portion.

3. The molding system of claim 1, wherein the computing apparatus is programmed to perform the second molding simulation by setting a zero-velocity boundary condition of the decorating film in the second portion along a first direction perpendicular to a flow direction of the fluid molding material.

4. The molding system of claim 3, wherein the computing apparatus is programmed to perform the second molding simulation by setting a zero-velocity boundary condition of the decorating film in the second portion along a second direction perpendicular to the first direction and perpendicular to the flow direction of the fluid molding material.

5. The molding system of claim 1, wherein the computing apparatus is programmed to further perform a step of calculating a bulk displacement of the decorating film using the velocity distribution of the second portion.

6. The molding system of claim 1, wherein the computing apparatus is programmed to perform the first molding simulation using an initial velocity of the decorating film to set the boundary condition of the first portion.

7. The molding system of claim 1, wherein the computing apparatus is programmed to set an initial velocity of the decorating film to be zero.

8. The molding system of claim 1, wherein the second molding simulation generates the velocity distribution of the portion of the decorating film transformed from the solid state to the melted state along a thickness direction with respect to the filling time of the fluid molding material.

9. The molding system of claim 1, wherein the computing apparatus is programmed to further perform a step of repeating the first molding simulation using the velocity distribution of the decorating film to set the boundary condition of the first portion.

10. The molding system of claim 1, wherein the second molding simulation generates the temperature distribution of the portion of the decorating film transformed from the solid state to the melted state along a thickness direction with respect to the filling time of the fluid molding material.

11. The molding system of claim 10, wherein the computing apparatus is programmed to further perform a step of repeating the first molding simulation using the temperature distribution of the decorating film to set the boundary condition of the first portion.

* * * * *